United States Patent [19]

Girard et al.

[11] E Re. 29,229

[45] Reissued May 24, 1977

[54] CONTACT LENS HAVING AN INDEX OF REFRACTION APPROXIMATING THAT OF HUMAN TEARS

[75] Inventors: Louis J. Girard; Whitney G. Sampson; Joseph W. Soper, all of Houston, Tex.

[73] Assignee: E. I. Du Pont de Nemours and Company, Wilmington, Del.

[22] Filed: Nov. 24, 1972

[21] Appl. No.: 309,443

Related U.S. Patent Documents

Reissue of:

[64] Patent No.: 3,542,461
Issued: Nov. 24, 1970
Appl. No.: 684,364
Filed: Nov. 20, 1967

[52] U.S. Cl. ..... 351/160
[51] Int. Cl.[2] ..... G02C 7/04
[58] Field of Search ..... 351/160

[56] References Cited

UNITED STATES PATENTS

| | | | |
|---|---|---|---|
| 2,628,958 | 2/1953 | Bittles | 351/160 X |
| 3,187,338 | 6/1965 | Neefe | 351/160 |
| 3,228,741 | 1/1966 | Becker | 351/160 |
| 3,246,941 | 4/1966 | Moss | 351/160 |
| 3,274,091 | 9/1966 | Amborski | 351/160 X |
| 3,281,511 | 10/1966 | Goldsmith | 351/160 X |
| 3,282,905 | 11/1966 | Fasick et al. | 351/160 X |
| 3,307,330 | 3/1967 | Niedzielski et al. | 351/160 X |
| 3,308,107 | 3/1967 | Selman et al. | 351/160 X |
| 3,458,348 | 7/1969 | Sherman | 428/422 |
| 3,475,521 | 10/1969 | Stroop | 351/160 X |
| 3,556,635 | 1/1971 | Schrenk et al. | 350/96 B |

OTHER PUBLICATIONS

Apt, Article in *Transactions of the Am. Academy of Ophthalmology and Otolaryngology*, vol. 69, Mar.–Apr. 1965, p. 357.

Girard et al., Article in *American Journal of Ophthalmology*, May 1966, pp. 1109–1111 & 1113–1123.

*Primary Examiner*—David H. Rubin
*Attorney, Agent, or Firm*—Arnold, White & Durkee

[57] ABSTRACT

A wettable contact lens of the type applied to the human eye to correct vision deficiencies, said lens formed of a transparent, dimensionally stable, solid material characterized by an index of refraction approximating that of the human tears.

18 Claims, 4 Drawing Figures

CONTACT LENS HAVING AN INDEX OF REFRACTION APPROXIMATING THAT OF HUMAN TEARS

Matter enclosed in heavy brackets [ ] appears in the original patent but forms no part of this reissue specification; matter printed in italics indicates the additions made by reissue.

BACKGROUND OF THE INVENTION

Although known and used for some years, contact lenses have not achieved full acceptance by most members of the public having vision difficulties requiring correction. Contact lenses of the scleral type cover a substantial area of the eye during use, thereby sealing off circulation of tears and the atmosphere. This causes partial asphyxiation which affects the metabolism and vision of the eye. The more recent corneal lenses, because of their relatively smaller size and lighter weight, usually cause less irritation to the cornea, and have achieved greater acceptance. However, the "break-in" period necessary to accustom the cornea of the wearer to support a corneal lens, while varying from person to person, depending upon the individual's sensitivity of the cornea, usually extends over a considerable period of time. Some persons have found contact lenses to be intolerable because of the eye irritation resulting during and after any extended period of continuous wear.

Effort has been made to design both scleral and corneal lenses to fit more comfortably. For example, U.S. Pat. Nos. 2,240,157-Gagnon et al and 2,330,837-Mullen suggest methods for producing a scleral lens in which the scleral band fits the contour of the eye of the wearer. However, the corneal portion of the lens clears the cornea and limbus, so that the lens never contacts the cornea when worn. Such lenses have generally required the use of an accessory fluid in the space between the cornea and the ground-out corneal area of the lens. Application of such lenses to the eye is difficult and painful, and they have not achieved wide popularity.

It has been suggested that eye irritation could be reduced by designing the contact lenses with various radii of curvature. U.S. Pat. No. 2,544,246-Butterfield suggests that the corneal lens have an inner spherical central area and an outer marginal portion formed by a series of separate and distinct steps to introduce a parabolic fit. U.S. Pat. No. 2,510,438-Tuohy, discloses a contact lens having a radius of curvature on its concave side slightly greater than the radius of curvature of the cornea, with an increasing clearance at the marginal areas of the lens. Feinbloom U.S. Pat. No. 3,227,507 discloses the production of a corneal contact lens having an inner ellipsoidal surface. While lenses disclosed in the foregoing patents offer an improvement over scleral type lenses, they nevertheless tend to cause considerable irritation to the eye, and on the average cannot be worn in excess of ten hours.

Use of softer material in the production of contact lenses to provide a more comfortable lens has also been suggested. U.S. Pat. No. 3,228,741-Becker discloses the use of a filler, transparent, hydrocarbon substituted polysiloxane rubber as a contact lens material. Lenses of this material are said to possess a softness similar to that of the upper lid of the human eye, a high permeability to carbon dioxide, oxygen, and water vapor, and an index of refraction ranging from 1.49 to 1.56, depending upon the amount of filler material used. Because of their soft, elastic characteristics, such materials do not lend themselves to consistent production of high quality contact lenses, nor are they dimensionally stable.

Wichterle et al. U.S. Pat. No. 3,220,960, discloses a hydrogel material consisting of from 20 to 90 percent of an aqueous liquid, and a cross-linked hydrophilic polymer. However, lenses made of such materials are handicapped by optical problems. Notably, the effective power of the lens changes as it is worn. Also, such lenses may be torn easily while in the hydrated state, or broken in the dehydrated state, thus adding a handling problem to their use. Moreover, such porous hydrogels are receptive to bacterial invasion and proliferation. Despite assertions to the contrary, it has been found that such hydrogel materials do not afford extended periods of comfortable wear in a high percentage of cases. An excellent discussion of the disadvantages of such lenses is found in Precision-Cosmet Digest, Vol. 5, No. 9, April 1965.

Due to the limitations of the foregoing materials, contact lenses in commercial use at this time are almost universally manufactured from polymethyl methacrylate, an optically clear, moldable, synthetic polymer material characterized by an index of refraction of 1.49. However, as a result of the problems noted above in producing a lens which fits comfortably, lenses made from polymethyl methacrylate can be worn only for relatively limited periods of time.

It is therefore a primary object of the invention to provide an improved contact lens.

Another object of the invention is to provide a contact lens which affords a comfortable fit, and which may be worn for extended periods of time without causing irritation to the eye.

Yet another object of the invention is to provide a contact lens having an index of refraction approaching that of human tears.

A further object of the invention is to provide a contact lens whose posterior surface conforms with the anterior surface of the human cornea and/or sclera.

It is still another object of the invention to provide a contact lens which significantly diminishes the aberrations due to reflected light occurring with conventional contact lenses of the prior art.

SUMMARY OF THE INVENTION

It has now been discovered that contact lenses which can be worn comfortably over extended periods of time are attained if a wettable lens is fabricated from a transparent, dimensionally stable, solid material characterized by an index of refraction approximating that of the human tear. This may be achieved in accordance with one aspect of the present invention by providing a contact lens of such a material in which the posterior surface of the lens conforms with the varying topography of the anterior segment of the human cornea and/or sclera.

The present invention takes advantage of the fact that differences between the indices of refraction on either side of an interface of a given curvature will result in a refractive or vergence power change at this interface depending upon the curvature and the indices of refraction. The refractive indices of the synthetic polymer materials most widely used as contact lenses vary from a low of 1.49 to a high of about 1.55. However, the total or combined index of refraction of the eye as an optical instrument averages to about 1.3375, or almost equal to that of the human tears (1.336).

The significant difference between the index of refraction of the eye and that of the material of which present lenses are composed limits the number of modifications, or so-called fitting curves which may be placed on the posterior aspect of the lens before the optical quality of the lens is impaired. Thus, when contact lenses made of a material having a higher index of refraction than the cornea are modified excessively within the optical zone of the lens, the resulting aberration due to the difference between the indices of refraction will significantly alter the visual acuity. This is particularly true in the case of flush-fitting therapeutic lenses where the curvature markedly departs from sphericity.

It has now been discovered that by using a transparent, dimensionally stable, solid material, characterized by an index of refraction approximating the index of refraction of the human tears and "workable" to the extent that it can be either molded or ground into a lens, any number of fitting curves or modifications can be made on the posterior aspect of the lens in order to give the best lens-corneal relationship and thus provide the optically perfect lens. The only optical requirement of lenses made in accordance with the invention is that the front surface of the lens be characterized by a curve of such power necessary to correct the refractive error of the eye. In air, lenses of the invention are aberrated when the anterior surface is spherical and the posterior surface is aspherical or irregular, i.e., conforms with the varying topography of the anterior segment of the human cornea and/or sclera. However, once the irregularity of the posterior surface is optically eliminated by placing it in contact with a medium of similar index of refraction, as for example the tear film, the aberrations optically disappear.

The present invention affords the production of contact lenses of both the corneal and scleral type which may be worn for periods of time considerably exceeding the average 10 hour period which is characteristic of conventional lenses of the prior art in accordance with the invention, "flush-fitting" lenses can be provided whose posterior surfaces precisely match the contour of the cornea of the wearer, thus affording a perfect, and hence comfortable fit.

In addition, lenses may be constructed in accordance with the invention in which the posterior aspects of the lenses are ground or molded by standard methods to provide an optical curve thereon. While such lenses do not afford the full advantages of comfort of the "flush-fitting" lenses, they nevertheless exhibit a marked improvement over the conventional lenses of the prior art. Notably, and quite unexpectedly it has been found that such lenses manufactured in accordance with the invention considerably diminish, and in some cases eliminate, the aberrations due to reflected light as manifested by halos, glare and streamers which normally occur with conventional prior art contact lenses when the wearer is exposed to bright lights shining into the eyes.

A critical feature of the invention is that the lenses thereof be constructed from a transparent, dimensionally stable, solid material characterized by an index of refraction approximating that of human tears. The transparency of the material should be adequate to assure good vision of the wearer of the lens, although the material need not necessarily be crystal clear. Materials having transparency characteristics similar to polymethyl methacrylate are preferred.

The refractive index of the material suitable for use in the practice of the invention should approximate that of human tears, i.e., must be no greater than 1.40. It is preferred, however, that the materials exhibit indices of refraction more nearly approaching the value of 1.336, the index of refraction of human tears. Generally speaking, when lenses are produced which are characterized by posterior surfaces matching the topography of the cornea of the wearer, indices of refraction of below 1.37 are preferred. Of course, optimum results are achieved when the material used exhibits an index of refraction below 1.34 and approaches the value characteristic of human tears (1.336).

Materials useful in the practice of the invention must also be characterized by good dimensional stability under the conditions normally encountered in the manufacture and use of the contact lenses made therefrom. In this connection it is important that the materials retain their dimensional stability under conditions that would be encountered when the lenses are removed from the eye and stored. Thus, the materials contemplated herein differ significantly from hydrogel materials which lose their dimensional stability when taken out of an aqueous environment.

The materials used to provide lenses in accordance with the invention should also be solid, i.e., have a Knoop hardness of at least 2, and preferably should be characterized by a hardness of 4 or more in order to facilitate the manufacture of contact lenses by the conventional methods known in the art. Of course, it is essential that the materials exhibit nontoxic properties so as to be compatible with the living tissue of the human eye.

Included among the materials which can be used in the practice of the invention are the terpolymers of hexafluoroacetone-tetrafluoroethylene-ethylene (HFA/TFE/E terpolymers) obtained from a reaction medium containing ethylene and tetrafluorethylene in 1:1 molar ratio and hexafluoroacetone in large molar excess, with the hexafluoroacetone as a complex with ROH in which the molar ratio of ROH with hexafluoroacetone may vary from 0.8–2.5 R may be hydrogen or alkyl.

Such HFA/TFE/E terpolymers have been found to be characterized by an index of refraction of the order of 1.39 and a Knoop hardness of about 8.6. Contact lenses in accordance with the invention can be molded or ground from such materials by methods well known to those skilled in the art.

A further class of materials useful in the practice of the invention include the polyperfluoroalkylethyl methacrylates of the type disclosed in U.S. Pat. No. 3,282,905, Fasick et al. Such methacrylates have been produced exhibiting indices of refraction of the order of 1.368–1.374 and a Knoop hardness of above 2. Such polymers are characterized by excellent clarity and are moldable at 130°–140° C.

By far the most preferred materials for use in the production of lenses in accordance with the invention are the copolymers and terpolymers of perfluoro-2-methylene-4-methyl-1.3-dioxolane, referred to hereinafter as PMD. The preparation of PMD as well as copolymers thereof is described in U.S. Pat. Nos. 3,307,330, Niedzielski et al. and 3,308,107, Selman et al. The refractive index of PMD homopolymer is in the range of 1.3308–1.3345, or somewhat below the optimum value of 1.336, the index of refraction of human tears. It has been found in this respect that the copolymers of PMD and tetrafluorethylene provide materials which are especially suitable in the practice of the present invention in that they exhibit refractive indices in the desired range, are characterized by good clarity, absence of color and haze, and further exhibit good hardness properties. As noted in the patent to Niedzielski et al. (3,307,330), such copolymers also exhibit permeability to oxygen and carbon dioxide. Accordingly, when contact lenses constructed of such materials are worn, oxygen and carbon dioxide are circulated through the lens, as well as underneath and around it, thus increasing the nutrition of the cornea. It has been found that a copolymer containing 92 parts by weight of tetrafluoroethylene with eight parts by weight of PMD was characterized by an index of refraction of 1.349 and a Knoop hardness of 4.9. The molding temperature of the copolymer was 350° C. In this respect, copolymers of PMD and tetrafluoroethylene characterized by optimum indices of refraction and lower molding temperatures as well as higher values of Knoop hardness may be prepared by copolymerizing from 10 to 20 weight percent of tetrafluoroethylene with from 80 to 90 weight percent of PMD.

It is essential that the lenses made in accordance with the invention be wettable by human tears. In this respect wettability may be determined by placing a drop of liquid on the substance whose wettability is to be tested and observing and measuring the receding and advancing contact angles, i.e., the angles the liquid makes on the solid surface at the three phase boundary as measured through the liquid in order for the material to be designated "wettable" the receding angle must be 0° and the advancing angle must be less than 90°.

While many of the materials useful in the practice of the invention may exhibit inherent wettability, as for example, the HFA/TFE/E terpolymer mentioned above, it may be necessary to impart wettability to the surface of contact lenses made from other materials useful in the practice of the invention which do not exhibit wettability. All of the materials mentioned above can be treated to impart wettability, and thus render the surfaces of contact lenses made therefrom hydrophilic. This may be achieved with some polymers by treating the materials with a wetting agent such as, for example, a 0.04 percent aqueous solution of alkyldimethylbenzylammonium chloride. Such treatment simply involves applying the wetting solution onto the lens or polymer surface and subsequently washing the lens with water to remove the applied solution. If a continuous film of water remains, the polymer wets satisfactorily. If beading occurs, wettability is questionable. Polymethyl methacrylate lenses of the type conventionally used are wetted by this procedure, and remain wettable after being placed in the eye. Other materials, notably the TFE/PMD copolymers and polyperfluoroalkyl ethyl methacrylates require a more vigorous treatment, such as exposure to corona discharge or a sodium etchant, to attain wettability. Other means for rendering contact lenses of the present invention wettable will readily occur to those skilled in the art.

Contact lenses of the invention may be produced from the above materials by the use of commercial contact lens grinding equipment and techniques well known to those skilled in the art. The lenses may be molded, machined and polished by known methods. In the event it is desired to produce a flush-fitting lens, i.e., a lens whose posterior surface precisely matches the varying topography of the cornea of the eye, the molding technique described in the article "Flush-Fitting Scleral Contact Lenses" appearing in the American Journal of Opthalmology, Volume 61, No. 5, Part II, May, 1966, may be used. Flush-fitting scleral lenses produced by that method are direct copies of the anterior segment of the eye, including both cornea and sclera, and follow in detail the surface contour of both. Only a capillary layer of tears separates the lens thus formed from the eye. Flush-fitting corneal lenses may be obtained by using the foregoing method to provide a flush-fitting lens, and thereafter cutting away the scleral band. The edges of the remaining corneal portion may then be machined to provide comfortable fit.

DESCRIPTION OF THE DRAWINGS AND PREFERRED EMBODIMENTS

For further objects and advantages of the invention and for a more detailed discussion of preferred embodiments thereof, reference is to be had to the following description taken in conjunction with the accompanying drawings in which.

Figure 1:
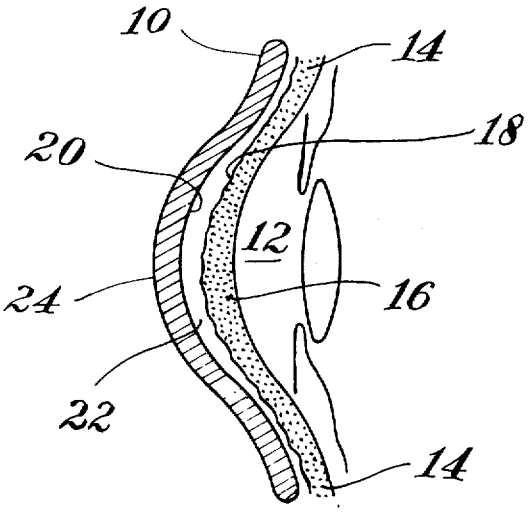
FIG. 1 is a vertical cross section of a portion of a human eye to which there has been applied a scleral contact lens of the type disclosed in the prior art.

Referring now to FIG. 1, the standard scleral contact lens 10 of the kind disclosed in the prior art, when fitted to the human eye 12, parallels the curvature of the anterior sclera 14 and then vaults the cornea 16, leaving between the anterior surface 18 (whose irregular contour has been exaggerated) of the cornea 16 and the posterior surface 20 of the lens 10 a space 22 filled with tears or a buffered solution. The posterior surface 20 of the contact lens 10 is an optical surface which, with the anterior curvature 24 of the lens, provides optical correction to the eye 12.

Figure 2:
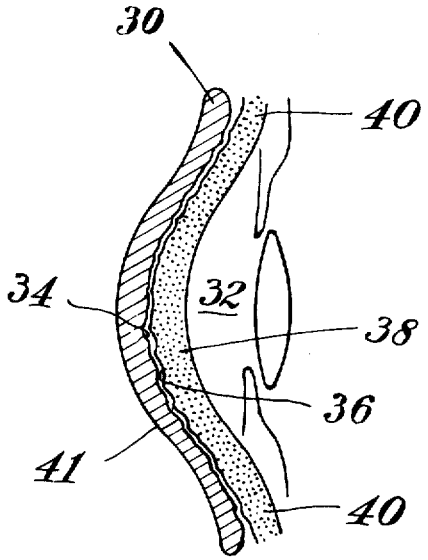
FIG. 2 is a vertical sectional view of a portion of the human eye to which there has been applied a contact lens embodying one form of the present invention.

FIG. 2 illustrates a scleral contact lens 30 forming one embodiment of the invention. Lens 30 is of generally concavo-convex cross section and is constructed of a transparent, dimensionally stable solid material characterized by an index of refraction approximating that of human tears. By virtue of the fact that the index of refraction of the material of which the lens 30 is composed approaches that of the tear film of the eye 32, the lens 30 may be constructed such that it is flush-fitting, i.e., the posterior segment 34 follows in exact detail the irregular surface contour 36 of the anterior segment of the eye, including both the cornea 38 and the sclera 40. Only a capillary layer of tears separates the lens from the eye. Thus the lens shown in FIG. 2 does not include an optical surface on its posterior base 34. Since the posterior aspect of the lens 30 matches in detail the surface contour of the cornea 38 and sclera 40 of the eye, it provides virtually a "glove fit." Optical correction is achieved by grinding a power surface on the interior surface 41 of the lens 30. Such a lens is most satisfactory from the wearer's standpoint and can be worn continuously for periods of time well exceeding 10 hours.

Figure 3:
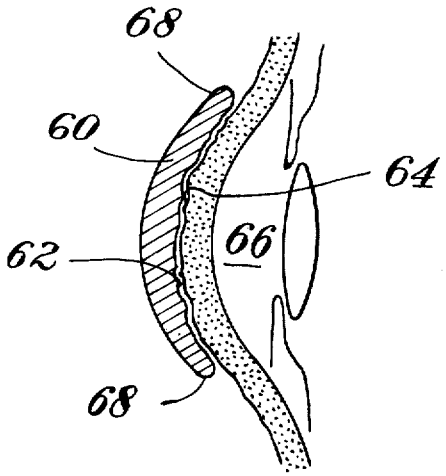
FIG. 3 is a vertical section of a portion of the human eye to which there has been applied a contact lens embodying another form of the invention.

In FIG. 3, a "flush-fitting" corneal contact lens 60 of the invention is shown fitted to a human eye. Lens 60 of generally concavo-convex cross section is constructed of a material characterized by an index of refraction approaching that of human tears, i.e., not greater than 1.40 and preferably of a value more closely approximating 1.336. The posterior surface 62 of the corneal lens 60 conforms with the topography of the anterior segment 64 of the eye 66. Such a corneal lens 60 may be constructed by cutting away the scleral band of a flush-fitting scleral lens such as shown in FIG. 2, and subsequently smoothing the edges 68 of the corneal portion to provide a comfortable fit.

Figure 4:
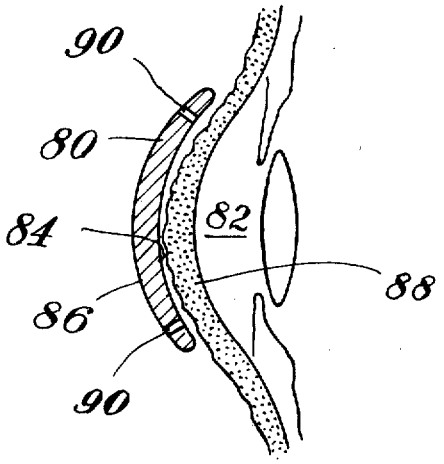
FIG. 4 is a vertical section of a portion of the human eye to which there has been applied a contact lens forming still another embodiment of the invention.

FIG. 4 illustrates a generally concavo-convex contact lens 80 of the invention having both its posterior surface 84 as well as its anterior surface 86 ground to provide optical correction. The lens 80 thus differs from the flush-type lenses shown in FIGS. 2 and 3. While the lenses of the type shown in FIG. 4 do not provide as comfortable a fit as those illustrated in FIGS. 2 and 3 and for the reason that their posterior surfaces do not conform precisely with the anterior surface contour of the cornea 88, the lenses nevertheless are a marked improvement over the conventionally available corneal contact lenses in that they significantly diminish and often eliminate the aberrations due to reflected light, as manifested by halos, glare and streamers which normally occur with conventional contact lenses when the wearer is exposed to bright lights shining into the eyes, as may occur during night driving. The lens shown in FIG. 4 can be constructed from the materials contemplated for use in accordance with the invention by methods and procedures well known to those skilled in the art. If desired, the lens 80 may be provided with minute channels or holes 90 to permit transport of tears and oxygen to the cornea. Such channels may be drilled in the lens by conventional methods without detracting from the optical properties of the lenses.

Generally speaking, lenses of the type illustrated in FIGS. 1–3 will be formed of polymer films having thicknesses varying from about 3 to about 25 mm. Preferably, the lenses will have a thickness of the order of 0.1–0.2 mm. minus lenses, and 0.15–0.50 mm. plus lenses.

The method of molding contact lenses of the type illustrated in FIGS. 2 and 3 can be the same as has been used in the past for standard scleral lenses. However, the subsequent manufacturing technique differs considerably from past methods since the posterior surface of a lens made in accordance with the invention is not modified into an optical surface as in a standard scleral lens, but remains a perfect replica of the cornea and sclera.

As mentioned above, a molding method which can be used to prepare a flush-fitting scleral contact lens of the invention is described in Volume 61, No. 5, Part II of the May, 1966, issue of the American Journal of Ophthalmology. Generally speaking, this method involves fitting a plastic casting shell device onto the eye, through the stem of the funnel is injected the impression material consisting of an opaque, rather viscous liquid prepared by mixing an alginate powder with water. An example of such a material is ophthalmic Moldite, a product manufactured by Obrig Laboratories, New York, N.Y., and consisting of an alginate gelling agent which reacts when mixed with water. Gelling of the material is retarded by an added preparation which gives sufficient time for the material to be placed on the eye and the molding shell centered.

After the alginate material is injected into the funnel and onto the eye, sufficient time (about 3 minutes) is permitted to elapse to permit the liquid to set to a gell impression which is then removed from the eye. A mixture is prepared from water and powdered plaster casting material and is then poured into the moist soft alginate impression still attached to the funnel. The alginate mold is vibrated while the mixture is poured into it, to prevent formation of bubbles. After about ten minutes, the stone mold has hardened enough so that it can be stripped from the alginate. The resulting stone mold can then be used to make the lens into a negative replica of the anterior corneal and scleral surfaces.

Flush-fitting scleral contact lenses of the invention may then be produced by heating a sheet of material characterized by an index of refraction approaching that of human tears to a temperature sufficiently high to permit the sheet material to conform to the surface of the mold upon the application of pressure. After cooling, the resulting lens is taken from the die and the anterior surface machined and polished to provide the desired optical surface.

As above noted, a flush-fitting corneal lens, as illustrated in FIG. 3, can be prepared by cutting away the scleral band of the flush-fitting scleral lens, and treating the edges of the corneal lens so that a comfortable fit may be attained.

As will be appreciated by those skilled in the art, it is also possible to prepare contact lenses in accordance with the invention through the use of conventionally available measuring devices such as the Radioscope, the Keratometer and the Toposcope. While such devices may be used to produce contact lenses whose posterior portions closely approximate the anterior segment of the eye, such lenses will not provide as satisfactory a fit as will be obtained from the flush-fitting lenses described above.

In order that those skilled in the art may better understand how the present invention may be practiced, the following examples are given by way of illustration and not by way of limitation. The lenses of examples 1–3 inclusive were prepared from the respective polymer films which were heated to their softening temperature and subsequently draped over the stone mold of a patient's eye. A female mold roughly conforming to the shape of the stone mold was then quickly pressed onto the polymer film and held tightly against it until the polymer hardened. Except for the HFE/TFE/E terpolymer (which was found to be inherently hydrophilic) the lenses constructed from the other polymers were treated to impart wettability.

EXAMPLE 1

A terpolymer was prepared by reacting hexafluoroacetone, tetrafluoroethylene and ethylene in a mole ratio of 1.6:1.0:1.0; the hexafluoroacetone being in the form of a 1:1 mol complex with methanol. The resulting polymer was characterized by an index of refraction of 1.392, a Knoop hardness of 8.6 and a molding temperature of 230° C. As previously mentioned, the polymer exhibited inherent wettability. A good scleral lens was molded from this polymer and appeared frosted, due to the irregular contour of the posterior surface of the lens. This frosting was substantially reduced when the lens was placed in water.

EXAMPLE 2

A scleral lens was molded from polyperfluoroalkylethyl methacrylate of the formula

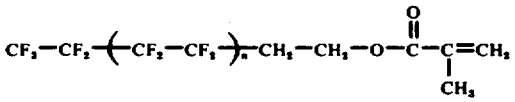

The polymer was obtained by polymerizing a mixture of monomers of the above formula in which mixture the monomer weight fractions were as follows: n=1, 1 percent; n=2, 50 percent; n=3, 35 percent; n=4, 7 percent; n=5, 1 percent. The resulting polymer had an index of refraction of 1.374 and a Knoop hardness of 2.03. Its molding temperature was about 130° C. A good scleral lens was produced from this polymer which appeared partly frosted on its posterior side and was opaque when viewed in air. However, the lens became fairly transparent when placed in water.

EXAMPLE 3

By the method outlined above, a scleral lens was obtained from a polyperfluoroalkylethyl methacrylate of the formula set forth above in which n equaled 3. The resulting polymer was characterized by an index of refraction of 1.368, a Knoop hardness of 2.08 and a molding temperature of 140° C. A good scleral lens was obtained from the material. The posterior aspect of the lens appeared frosted and the front surface was fairly smooth. The lens was opaque when viewed in air but became essentially clear when immersed in water.

EXAMPLE 4

A contact lens was prepared from a copolymer of tetrafluoroethylene and perfluoro-2-methylene-4-methyl-1.3-dioxolane (PMD). The refractive index of the copolymeric material was 1.3380 and the Knoop hardness was 4.9.

By virtue of the present invention there are provided contact lenses which are significantly improved over the lenses disclosed in the prior art. Notably, the contact lenses of the invention, by virtue of being constructed of materials characterized by indices of refraction approximating that of human tears, can be contour fitted to the eye to provide a perfect fit and thus enable the lenses to be worn for periods of time considerably exceeding the periods during which conventional lenses may be worn. Furthermore, the lenses of the invention have been found to reduce and often eliminate the aberrations due to reflected light which occur with ordinary contact lenses.

It should be understood that while the present invention has been described in considerable detail with respect to certain specific embodiments thereof, it is not to be considered limited to those embodiments, but may be used in other ways without departure from the spirit of the invention or the scope of the appended claims.

We claim:

1. A contact lens for providing optical correction to a human eye, said lens having a generally concavo-convex cross section with the concave surface adjacent to the eye and comprising a transparent, dimensionally stable, nontoxic polymer characterized by an index of refraction no greater than 1.40 and closely matching the index of refraction of human tears, and selected from the group consisting of polymers of hexafluoroacetone-tetrafluoroethylene-ethylene, polymers of perfluoroalkylethyl methacrylates, and polymers of perfluoro-2-methylene-4-methyl-1.3-dioxolane.

2. The contact lens of claim 1 in which the posterior surface of said lens conforms with the topography of a human eye, and said polymer is characterized by an index of refraction of no greater than 1.37.

3. The contact lens of claim 2 in the form of a scleral lens.

4. The contact lens of claim 1 characterized by an index of refraction no greater than 1.35.

5. The contact lens of claim 1 in which said transparent dimensionally stable, nontoxic polymer comprises a polymer of hexafluoroacetone-tetrafluoroethylene-ethylene.

6. The contact lens of claim 1 in which said transparent, dimensionally stable, nontoxic polymer comprises a polymer of a perfluoroalkylethyl methacrylate.

7. The contact lens of claim 6 in which the transparent, dimensionally stable, nontoxic polymer comprises a polymerized perfluoroalkylethyl methacrylate in which the alkyl group contains from 3 to 14 carbon atoms.

8. The contact lens of claim 7 in which the transparent, dimensionally stable, nontoxic polymer comprises a polymerized perfluoroalkylethyl methacrylate in which the alkyl group contains 3 carbon atoms.

9. The contact lens of claim 1 in which said transparent, dimensionally stable, nontoxic polymer comprises a polymer of perfluoro-2-methylene-4-methyl-1.3-dioxolane.

10. The contact lens of claim 9 in which the transparent, dimensionally stable, nontoxic polymer comprises a copolymer of perfluoro (2-methylene-4-methyl-1.3-dioxolane) and tetrafluoroethylene.

11. The contact lens of claim 10 in which said copolymer is composed of from 50 to 95 percent by weight of perfluoro (2-methylene-4-methyl-1.3-dioxolane) and from 5 to 50 percent by weight of tetrafluoroethylene.

*12. A solid, dimensionally stable corneal contact lens for providing optical correction to a human eye; said lens comprising a transparent, dimensionally stable non-toxic polymer and being characterized by reduced aberrations due to reflected light; said lens having both an anterior surface and a posterior surface shaped to provide optical correction; said lens having a refractive index no greater than 1.40 and having sufficient permeability to oxygen and carbon dioxide to permit circulation therethrough for nutrition of the cornea.*

*13. The contact lens of claim 12 wherein said lens has a Knoop hardness of at least 2.*

*14. The contact lens of claim 12 wherein said lens has a Knoop hardness of at least 4.*

*15. The contact lens defined in claim 12 wherein said lens includes minute holes to permit transport of oxygen to the cornea.*

*16. The contact lens defined in claim 12 wherein said polymer has sufficient permeability to oxygen and carbon dioxide to permit circulation therethrough for nutrition of the cornea.*

*17. The contact lens defined in claim 12 wherein the periphery of the lens is rounded to provide a comfortable fit.*

*18. The contact lens defined in claim 12, wherein said lens has a refractive index closely matching the index of refraction of human tears.*

* * * * *